(12) United States Patent
Tait

(10) Patent No.: US 10,611,314 B2
(45) Date of Patent: Apr. 7, 2020

(54) VEHICLE PRIVACY SCREEN

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/129,982

(22) Filed: Sep. 13, 2018

(65) Prior Publication Data

US 2019/0100151 A1  Apr. 4, 2019

Related U.S. Application Data

(60) Provisional application No. 62/565,478, filed on Sep. 29, 2017.

(51) Int. Cl.
| | |
|---|---|
| *A47C 7/62* | (2006.01) |
| *B60R 11/00* | (2006.01) |
| *B60R 21/06* | (2006.01) |
| *B60N 2/20* | (2006.01) |
| *B60N 2/64* | (2006.01) |
| *B60N 2/90* | (2018.01) |

(52) U.S. Cl.
CPC ............... *B60R 11/00* (2013.01); *B60N 2/20* (2013.01); *B60N 2/64* (2013.01); *B60N 2/91* (2018.02); *B60R 21/06* (2013.01); *B60N 2205/35* (2013.01); *B60R 2011/0015* (2013.01); *B60R 2011/0019* (2013.01); *B60R 2011/0082* (2013.01); *B60R 2011/0084* (2013.01)

(58) Field of Classification Search
CPC . B60R 11/00; B60R 21/06; B60R 2011/0015; B60R 2011/0019; B60R 2011/0082; B60R 2011/0084; B60N 2205/35; B60N 2/20; B60N 2/64
USPC ............... 297/184.1–184.15, 188.01–188.21; 296/24.4, 24.43, 24.46
See application file for complete search history.

(56) References Cited

U.S. PATENT DOCUMENTS

| | | | | |
|---|---|---|---|---|
| 2,884,279 A | * | 4/1959 | Halstead ................. | B60R 21/12 296/24.42 |
| 2,997,331 A | * | 8/1961 | Kudner ................. | B60R 21/026 296/24.46 |
| 3,525,535 A | * | 8/1970 | Yasusaburo ............. | B60R 21/06 280/749 |
| RE27,942 E | * | 3/1974 | Setina ..................... | B60R 21/12 296/24.42 |
| 3,891,263 A | * | 6/1975 | Orsulak ................. | B60R 5/047 296/24.43 |
| 3,931,994 A | * | 1/1976 | Palmiter ............ | B60H 1/00592 296/24.4 |
| 4,015,875 A | * | 4/1977 | Setina ..................... | B60R 21/12 296/24.46 |
| 4,168,094 A | * | 9/1979 | Yagi ........................ | B60R 5/047 296/37.16 |

(Continued)

FOREIGN PATENT DOCUMENTS

| | | |
|---|---|---|
| DE | 102007050139 A1 | 4/2009 |
| DE | 102008052841 B4 | 3/2011 |

*Primary Examiner* — Rodney B White
(74) *Attorney, Agent, or Firm* — Barnes & Thornburg LLP

(57) ABSTRACT

A vehicle has a vehicle cabin having a front vehicle seat system and a rear seat vehicle system. The front vehicle seat system is located in front of a rear seat vehicle system.

6 Claims, 3 Drawing Sheets

(56) References Cited

U.S. PATENT DOCUMENTS

| | | | | |
|---|---|---|---|---|
| 4,468,051 A * | 8/1984 | Kobayashi | B60N 2/143 | 280/751 |
| 4,588,223 A * | 5/1986 | Ledenyi | B60R 21/12 | 160/84.06 |
| 4,708,384 A * | 11/1987 | LaRosa | B60R 21/12 | 296/24.46 |
| 4,919,467 A * | 4/1990 | Guimelli | B60R 21/026 | 296/24.43 |
| 5,011,208 A * | 4/1991 | Lewallen | B60R 5/047 | 296/37.16 |
| 5,288,122 A * | 2/1994 | Pilhall | B60R 21/06 | 160/120 |
| 5,511,842 A * | 4/1996 | Dillon | B60N 2/24 | 224/400 |
| 5,551,726 A * | 9/1996 | Ament | B60R 21/06 | 280/749 |
| 5,632,520 A * | 5/1997 | Butz | B60R 5/006 | 296/24.43 |
| 5,848,817 A * | 12/1998 | Niehaus | B60R 21/026 | 296/24.46 |
| 5,876,064 A * | 3/1999 | Ament | B60R 21/06 | 280/749 |
| 5,971,433 A * | 10/1999 | Ament | B60R 21/06 | 280/749 |
| 5,971,487 A * | 10/1999 | Passehl | B60N 2/28 | 297/464 |
| 6,056,038 A * | 5/2000 | Foster | E06B 9/02 | 160/240 |
| 6,059,313 A * | 5/2000 | Coogan | B60R 21/026 | 280/749 |
| 6,155,621 A * | 12/2000 | Nishida | B60R 21/06 | 280/749 |
| 6,217,096 B1 * | 4/2001 | Koiwa | B60N 2/3011 | 296/24.43 |
| 6,250,700 B1 * | 6/2001 | Traxler | B60N 2/24 | 160/135 |
| 6,286,882 B1 * | 9/2001 | Rastetter | B60J 7/223 | 296/24.41 |
| 6,349,986 B1 * | 2/2002 | Seel | B60R 5/047 | 160/265 |
| 6,547,298 B2 * | 4/2003 | Sotiroff | B60J 5/047 | 280/748 |
| 6,598,921 B2 * | 7/2003 | Seel | B60P 7/083 | 160/291 |
| 6,644,736 B2 * | 11/2003 | Nguyen | B64D 11/06 | 160/84.07 |
| 6,669,259 B2 * | 12/2003 | Murray | B60R 7/14 | 296/24.46 |
| 6,843,518 B2 * | 1/2005 | Schlecht | B60N 2/3011 | 280/749 |
| 6,874,667 B2 * | 4/2005 | Dykstra | B60R 5/04 | 224/275 |
| 6,930,592 B2 * | 8/2005 | Schlecht | B60R 5/047 | 340/426.1 |
| 6,962,382 B2 * | 11/2005 | Scarlett | B60R 21/026 | 296/24.42 |
| 6,966,591 B2 * | 11/2005 | Schlecht | B60R 5/047 | 160/370.22 |
| 7,086,678 B2 * | 8/2006 | Schlecht | B60R 21/026 | 296/24.43 |
| 7,118,152 B2 * | 10/2006 | Cucknell | B60R 5/047 | 296/37.16 |
| 7,140,659 B2 * | 11/2006 | Walter | B60R 5/047 | 296/37.16 |
| 7,195,297 B2 * | 3/2007 | Murray | B60R 7/14 | 296/24.4 |
| 7,559,593 B2 * | 7/2009 | Luik | B60R 5/047 | 296/24.43 |
| 7,562,931 B2 * | 7/2009 | Stojanovic | B60N 2/3013 | 296/24.4 |
| 7,568,759 B2 * | 8/2009 | Schurg | B64D 11/06 | 297/184.1 |
| 7,641,278 B2 * | 1/2010 | Strasser | B64D 11/06 | 244/118.6 |
| 7,806,452 B2 * | 10/2010 | Storer | B60R 21/12 | 280/749 |
| 8,091,961 B2 * | 1/2012 | Dryburgh | B60N 2/01 | 297/184.1 |
| 8,720,991 B2 * | 5/2014 | Macleod | B60R 21/026 | 224/275 |
| 8,876,184 B2 * | 11/2014 | Lucas | B60R 7/043 | 296/24.44 |
| 9,352,694 B2 * | 5/2016 | Inedia | B60R 5/045 | |
| 9,511,733 B2 * | 12/2016 | Maier | B60R 21/06 | |
| 9,567,085 B2 * | 2/2017 | Suzuki | B64D 11/0606 | |
| 9,956,898 B1 * | 5/2018 | Dellock | B60Q 3/12 | |
| 9,975,491 B2 * | 5/2018 | Morlet Ugalde | B60R 5/047 | |
| 10,059,238 B1 * | 8/2018 | Salter | B60N 2/90 | |
| 2003/0090120 A1 * | 5/2003 | Barber | B60R 5/04 | 296/37.5 |
| 2005/0012352 A1 * | 1/2005 | Sparrer | B60R 21/06 | 296/24.43 |
| 2005/0194827 A1 * | 9/2005 | Dowty | B60N 2/62 | 297/411.3 |
| 2009/0179457 A1 * | 7/2009 | Platto | B60H 1/0055 | 296/190.09 |
| 2011/0260484 A1 * | 10/2011 | Takemura | B60R 5/047 | 296/24.43 |
| 2011/0266822 A1 * | 11/2011 | Takemura | B60R 21/06 | 296/24.43 |

* cited by examiner

VEHICLE PRIVACY SCREEN

PRIORITY CLAIM

This application claims priority under 35 U.S.C. § 119(e) to U.S. Provisional Application Ser. No. 62/565,478, filed Sep. 29, 2017, which is expressly incorporated by reference herein.

BACKGROUND

The present disclosure relates to a vehicle, and particularly to a vehicle seat. More particularly, the present disclosure relates to vehicle seat including a seat bottom and a seat back.

SUMMARY

According to the present disclosure, a vehicle comprises a vehicle cabin with a front vehicle seat system and a rear seat system. The front seat system is arranged in a front-seat compartment and the rear seat system arranged in a rear-seat compartment.

In illustrative embodiments, the vehicle further includes a privacy screen coupled to one of the front-vehicle seat system or the rear-vehicle seat system to move therewith. The privacy screen is configured to expand from a compact-storage state in which the privacy screen is stored out of use to an expanded-use state in which the privacy screen extends into a space to limit a sight and access to a part of the vehicle cabin.

In illustrative embodiments, the front seat system includes at least one vehicle seat and the privacy screen is coupled to a seat back of the at least one vehicle seat to move therewith. The privacy screen is coupled to an upper edge of the seat back. The privacy screen is configured to limit sight and access between the front-seat compartment and the rear-seat compartment in the expanded-use state.

In illustrative embodiments, the privacy screen includes a curtain that extends from a first end of the privacy screen to a second, opposite end of the privacy screen. In some embodiments, the privacy screen is pivotable about the first end and is folded against a seat of the front-vehicle seat system or the rear-vehicle seat system when in the compact-storage state and moves to extend away from the seat in the expanded-use state.

In illustrative embodiments, the rear-vehicle seat system includes at least one vehicle seat and the privacy screen comprises a curtain that is coupled to the seat back of the at least one vehicle seat. The privacy screen is coupled to a side edge of the seat back and extends longitudinally along a length of the side edge of the seat back to limit sight and access between two points in the rear-seat compartment in the expanded-use state.

In illustrative embodiments, the vehicle comprises a controller. The controller is configured to receive user inputs and actuate expansion of the privacy screen from the compact-storage state to the expanded-use state.

In illustrative embodiments, a vehicle comprises a vehicle cabin with a front vehicle seat system arranged in a front-seat compartment and a rear seat system arranged in a rear-seat compartment and a privacy screen coupled to the front-vehicle seat system. The privacy screen is configured to expand from a compact-storage state in which the privacy screen is stored out of use to an expanded-use state in which the privacy screen extends into a space to limit sight and access between the front-seat compartment and the rear-seat compartment.

In illustrative embodiments, the front vehicle-seat system comprises a first seat positioned in lateral relation to a second seat and the privacy screen comprises a first curtain coupled to the first seat to move therewith and a second curtain coupled to the second seat to move therewith. Each of the first and second curtains is pivotable about a first end from the compact-storage state in which the curtain is folded against a seat of the front-vehicle seat system to the expanded-use state in which the curtain extends away from the seat. Each of the first and second curtains pivot relative to the seats and converge with one another to limit a space between the first and second seats in the expanded-use state.

In illustrative embodiments, each of the first and second curtains comprise a fastener configured to secure the first curtain to the second curtain in the expanded-use state.

In illustrative embodiments, the vehicle comprises a controller configured to receive user inputs and actuate expansion of the privacy screen from the compact-storage state to the expanded-use stat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
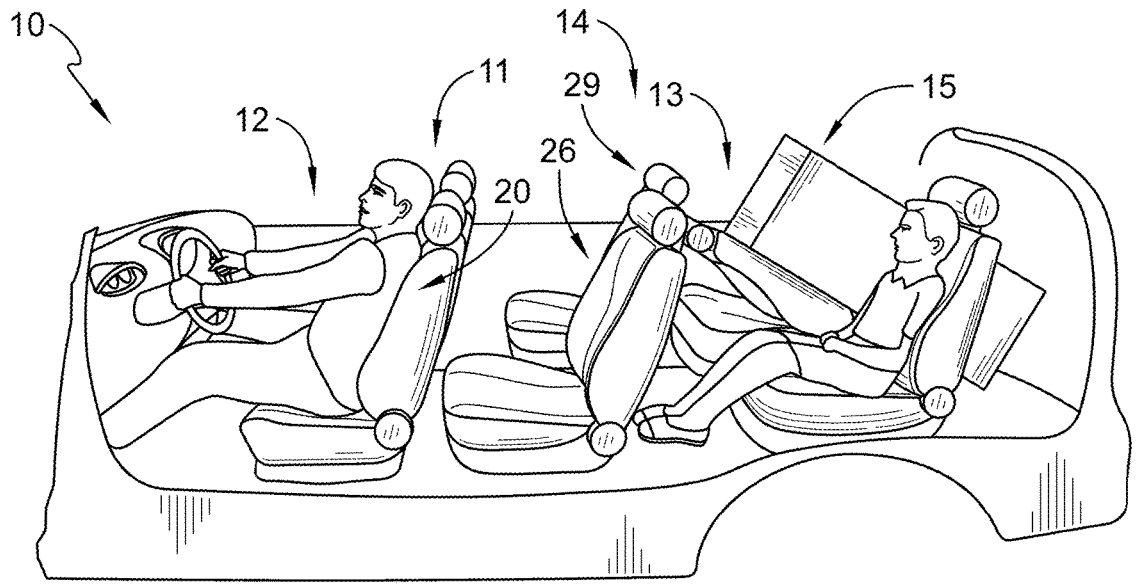
FIG. 1 is a perspective and diagrammatic view, in accordance with the present disclosure, showing a vehicle cabin including a front-seat compartment and a rear-seat compartment.
Figure 3:
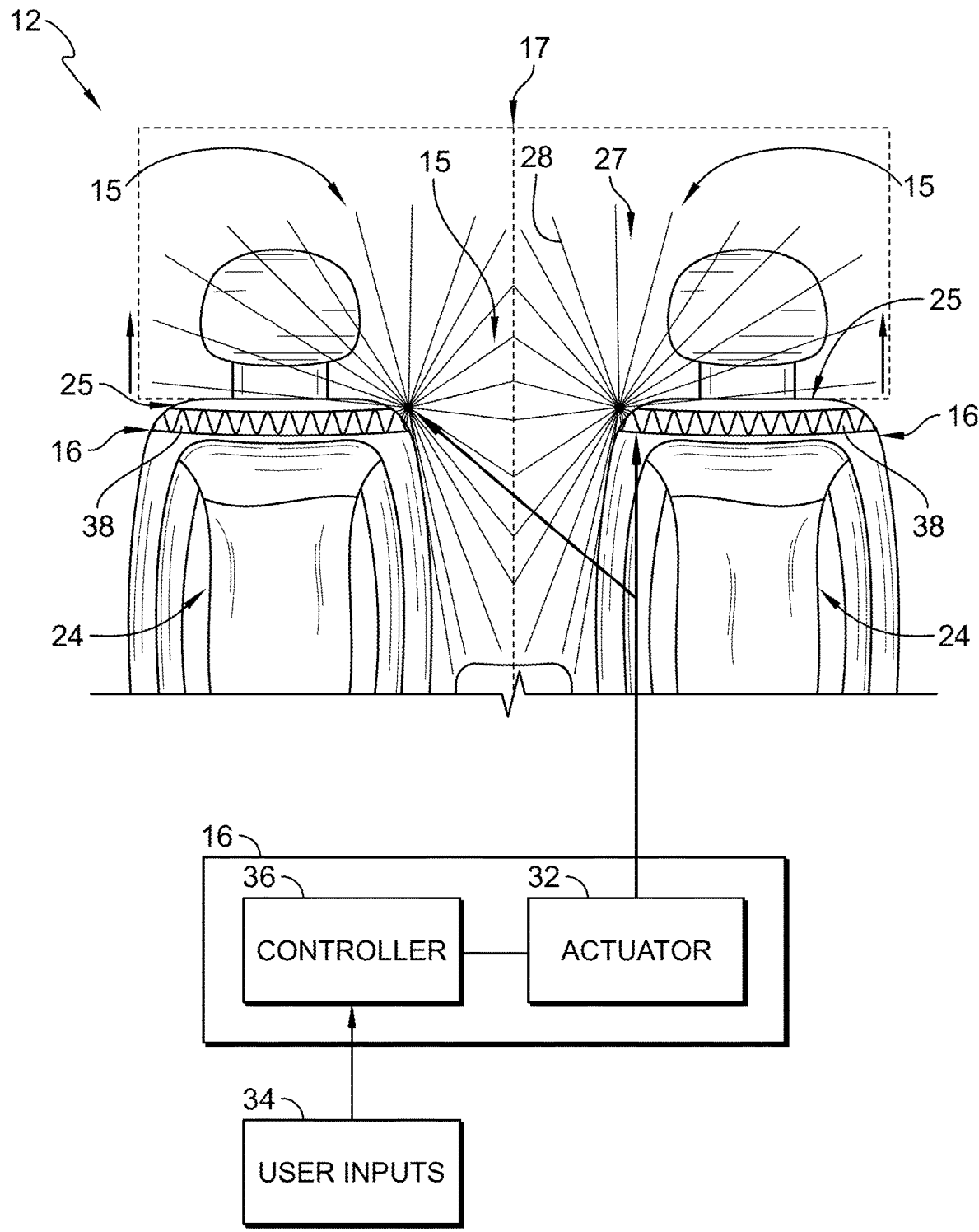
Figure 4:
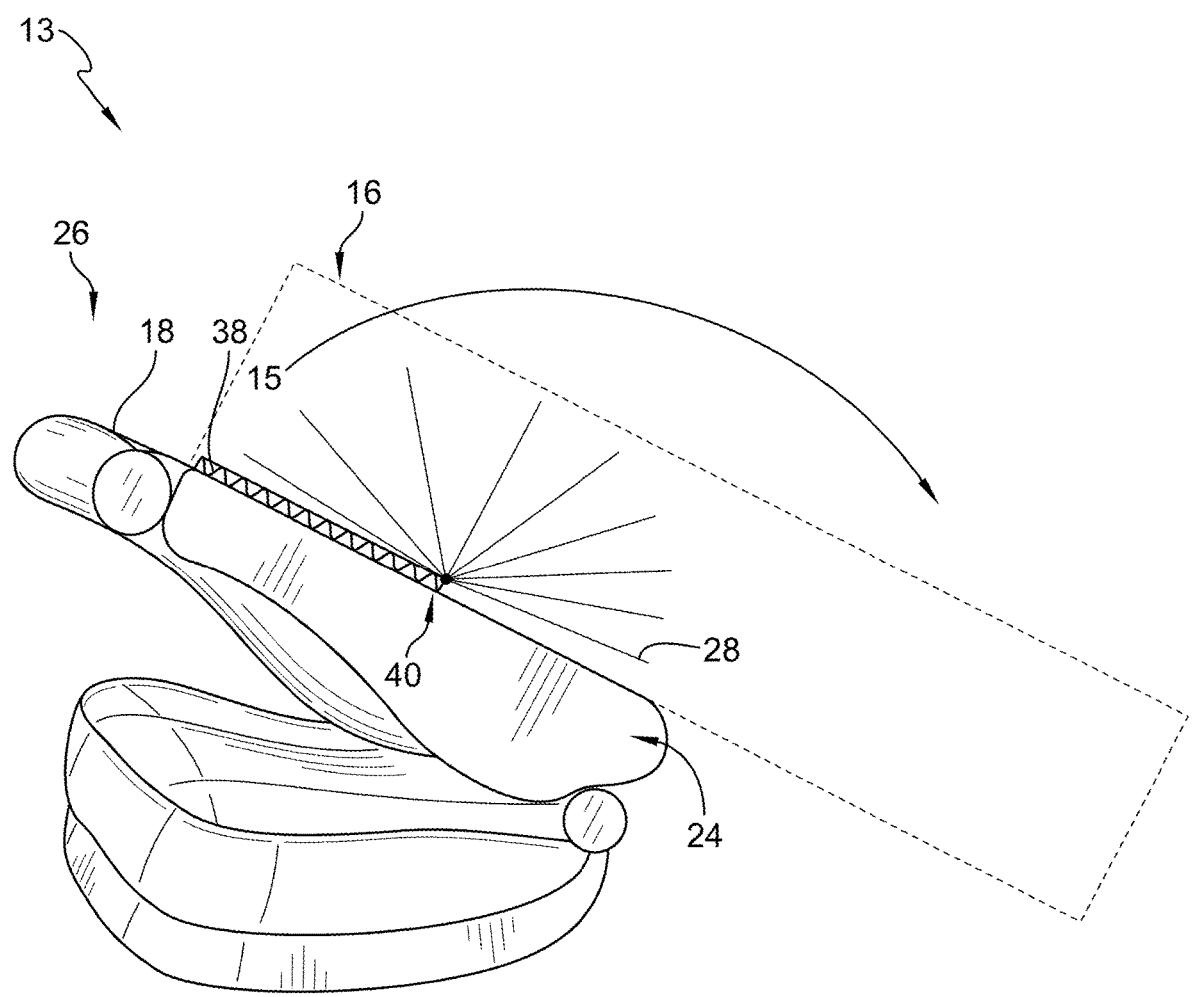

FIG. 3 is a rear elevation view of a privacy screen deployed from a vehicle seat of the front-seat compartment to block the sight and access to the front-seat compartment from the rear-seat compartment and partial schematic block diagram of a control system for automating movement of the privacy curtain between expanded-use state and compact-storage state; and FIG. 4 is a perspective view of the rear-seat compartment of FIG. 1 showing the privacy screen is deployed from a vehicle seat in the rear-seat compartment to block sight and access to a portion of the rear-seat compartment.

DETAILED DESCRIPTION

A vehicle 10, in accordance with the present disclosure, has an interior cabin that includes a front vehicle-seat system 11 arranged in a front-seat compartment 12 of the cabin and a rear vehicle-seat system 13 arranged in a rear-seat compartment 14 of the cabin as shown in FIG. 1. The front-seat compartment 12 can be separated from the rear-seat compartment 14 by a privacy screen 16 that is deployed to separate the front-seat compartment 12 and the rear-seat compartment 14 as shown in FIGS. 2-3.

Figures 2A, 2B:
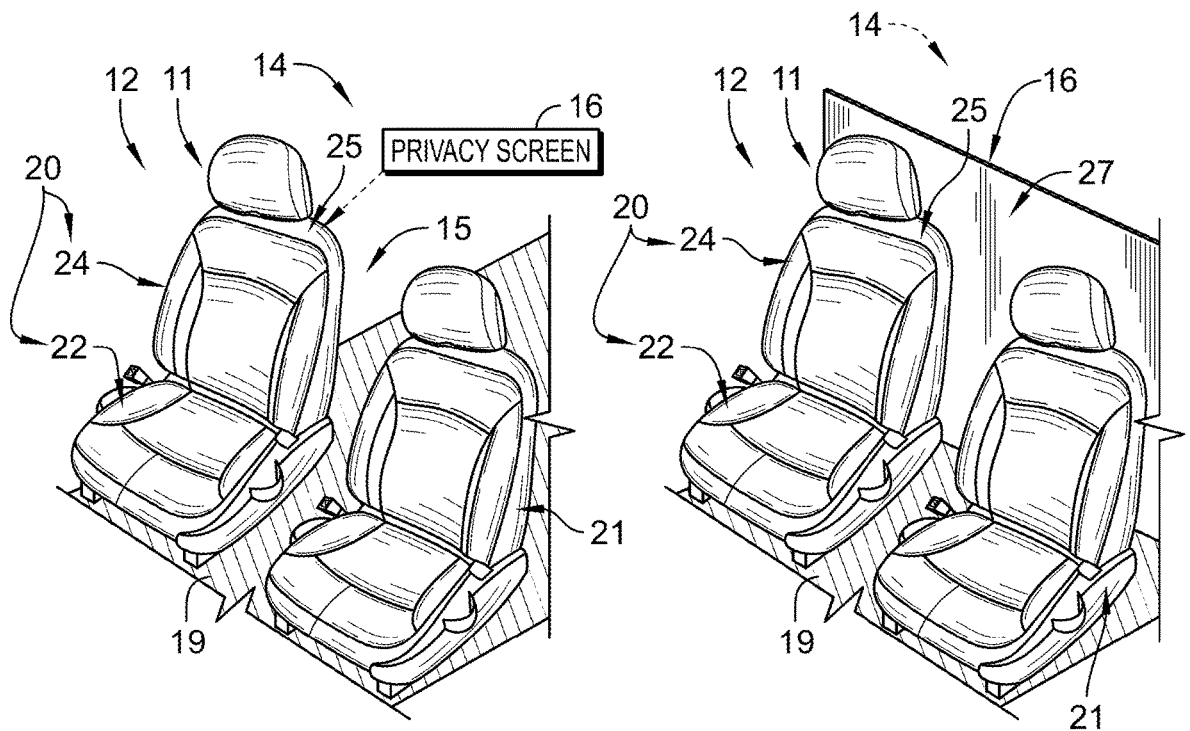
FIG. 2A is a perspective view of the front-seat compartment of FIG. 1 showing that a privacy screen in a stowed position may be located in a position to separate the front-seat compartment and the rear-seat compartment.
FIG. 2B is a perspective view similar to FIG. 2A showing that the privacy screen is displayed between the front-seat compartment and the rear-seat compartment to block sight and access to the front-seat compartment from the rear-seat compartment.

Front vehicle-seat system 11, includes at least one vehicle seat 20, having a seat bottom 22 arranged to overlie a vehicle floor 19 and a seat back 24 arranged to extend upwardly away from the seat bottom 22 as shown in FIGS. 1 and 2A-2B. The rear vehicle-seat system 13 also includes at least one vehicle seat 26 that is similar to the vehicle seat 20 in the front vehicle-seat system 11.

According to one example, the privacy screen 16 is arranged in the front vehicle-seat system 11 in a compact-storage state as shown in FIG. 2A. Privacy screen 16 is configured to expand from the front vehicle-seat system 11 to an expanded-use state to block sight and access to the front-seat compartment 12 from the rear-seat compartment 14 in order to maximize privacy for occupants in the front-seat compartment 12 and rear-seat compartment 14 as shown in FIG. 2B. The privacy screen 16 includes a curtain that is folded or compressed when the privacy screen 16 is in the compact-storage state as shown in FIG. 2A and expands to a generally flat planar shape when the privacy screen 16 is in the expanded-use state as shown in FIG. 2B.

Privacy screen 16 is coupled to seat back 24 of vehicle seat 20 in the compact-storage state and is arranged along an upper edge 25 of the seat back 24 as shown in FIG. 2A. Privacy screen 16 includes a first end coupled to one side of upper edge 25 and a second end coupled to an opposite side of the upper edge 25. Privacy screen 16 is configured to pivot about a pivot axis located at the first end coupled to one side of the upper edge 25 as the second end of the privacy screen 16 unfolds and extends away from the seat back 24 as suggested by the rotational pivot arrow 15 the radial lines and directional arrow in and around the privacy screen 16 as seen in FIG. 3. In some embodiments, the pivot axis is generally parallel to a longitudinal axis of the vehicle. In another example, the first and second end of the privacy screen 16 both expand away from the seat back 24 in a direction perpendicular to or at some other angle to the seat back 24.

The front vehicle-seat system 11 may further include another seat 21 positioned adjacent the vehicle seat 20 as shown in FIGS. 2A-3. Each vehicle seat 20-21 may include a respective privacy screen 16 stored in the seat back 24 of each seat 20, 21 in a compact-storage state. When privacy screens 16 are deployed and are in the expanded-use state, the privacy screens 16 converge in the space between the vehicle seats 20, 21 and closed the space. Privacy screens 16 are shown in a compact-storage state 38 in FIG. 3 and in phantom in an expanded-use state 16. The privacy screens 16 may overlap or otherwise couple to one another along and end of each screen 17, such as in end-to-end relation, in space. Privacy screens 16 may be coupled together by fastener means such as hook-and-loop structures, tabs, key-and-slot structures, magnets, adhesives or any other suitable means of coupling the privacy screens 16 together. Privacy screens 16 may also couple to other areas of the vehicle such as the vehicle seats 20, 21, a vehicle ceiling, a vehicle sidewall, a vehicle door, a vehicle console, vehicle floor, or other areas of the vehicle cabin by the same fastener means.

Each privacy screen 16 may be expanded to the expanded-use state either manually or automatically as shown in FIG. 3. Privacy screen 16 may be coupled to a controller 36 and an actuator 32, which may be operated via user inputs 34 at the controller 36. Controller 36 may include one or more buttons, switches, dials or capacitance screen user interfaces configured to expand and retract the privacy screen 16. A user may provide the user inputs 34 into the controller 36 to drive actuator 32 to change the privacy screen 16 between the compact-storage state and the expanded-use state. Alternatively, privacy screen 16 may be manually moved between compact-storage and expanded-use states.

FIG. 4 illustrates an embodiment of a privacy screen 16 arranged on a vehicle seat back 18 in a vehicle seat 26. Privacy screen 16 is coupled to seat back in the compact-storage state and is arranged along a longitudinal edge 40 of the seat back 24. Although shown along an outer edge of the seat back, it may alternatively extend along a middle or any other longitudinal extension of the seat back. Privacy screen 16 includes a first end coupled to one side of longitudinal edge 40 and a second end coupled to an opposite end of longitudinal edge 40. Privacy screen 16 is configured to pivot about a pivot axis located at the first end coupled to one side of the longitudinal edge 40 as the second end of the privacy screen 16 unfolds and extends radially away and longitudinally greater than a length of the privacy screen in the compact-storage state 38 along longitudinal edge 40 as shown in phantom dotted line. The screen 16 in the expanded-use state is configured to limit visibility or access to some other point in the rear-seat compartment 14.

Privacy screen 16 in its expanded use state is illustrated in phantom and expands as suggested by the rotational pivot arrow 15 the radial lines in and around the privacy screen 16 as seen in FIG. 4. In some embodiments, the pivot axis is generally perpendicular to, or at some other angle relative to a longitudinal axis of the vehicle. In some embodiments, a plurality of vehicle seats 26 in the rear-seat vehicle compartment 14 may include a privacy screen 16. For example, in FIG. 1 a seat in a middle row directly in front of the rear-most seat showing privacy screen 16 may include a privacy screen so that more of the right side of the vehicle may be limited in visibility, or block sunlight.

In some embodiments, the privacy screen 16 may include curtain guides 28 arranged in the curtain and configured to guide the curtain 27 as the privacy screen 16 changes from the compact-storage state to the expanded-use state. In some embodiments, the curtain guides 28 are supports that extend from the first end to the second end of the privacy screen and reinforce the privacy screen 16. In some embodiments, threads or other suitable guide structures may be used. In some examples, the privacy screen 16 may be used as a projection screen to display videos thereon. In some embodiments, privacy screen 16 may comprise one more layers. In some embodiments, each of the one or more layers added may increase the opacity of the privacy screen 16. In some embodiments, privacy screen 16 may be sun-blocking, semi-transparent, or opaque. In some examples, the privacy screen 16 is opaque and may be used as a projection screen to display videos thereon. The various privacy screen configurations disclosed may be arranged in any of the seats in the vehicle 10.

The invention claimed is:

1. A vehicle comprising
a vehicle cabin with a front vehicle seat system arranged in a front-seat compartment and a rear seat system arranged in a rear-seat compartment and
a privacy screen coupled to the front-vehicle seat system and configured to expand from a compact-storage state in which the privacy screen is stored out of use to an expanded-use state in which the privacy screen extends into a space to limit sight and access between the front-seat compartment and the rear-seat compartment,
wherein the front vehicle-seat system comprises a first seat positioned in lateral relation to a second seat and the privacy screen comprises a first curtain coupled to the first seat to move therewith and a second curtain coupled to the second seat to move therewith.

2. The vehicle of claim 1, wherein each of the first and second curtains is pivotable about a first end from the compact-storage state in which the curtain is folded against a seat of the front-vehicle seat system to the expanded-use state in which the curtain extends away from the seat.

3. The vehicle of claim 2, wherein the first and second curtains pivot relative to the seats and converge with one another to limit a space between the first and second seats in the expanded-use state.

4. The vehicle of claim 1, wherein each of the first and second curtains comprise a fastener configured to secure the first curtain to the second curtain in the expanded-use state.

5. The vehicle of claim 1, further comprising a controller configured to receive user inputs and actuate expansion of each of the first and second curtains from the compact-storage state to the expanded-use state.

6. The vehicle of claim 1, wherein the first curtain is coupled to an upper edge of a seat back of the first seat, and the second curtain is coupled to an upper edge of a seat back of the second seat.

\* \* \* \* \*